US008055934B1

(12) United States Patent
Blinick et al.

(10) Patent No.: US 8,055,934 B1
(45) Date of Patent: Nov. 8, 2011

(54) ERROR ROUTING IN A MULTI-ROOT COMMUNICATION FABRIC

(75) Inventors: Stephen LaRoux Blinick, Tucson, AZ (US); Scott Alan Brewer, Tucson, AZ (US); Trung Ngoc Nguyen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/820,779

(22) Filed: Jun. 22, 2010

(51) Int. Cl.
*G06F 11/00* (2006.01)
(52) U.S. Cl. .......... 714/4.11; 714/4.12; 714/5.1; 714/10
(58) Field of Classification Search .................. None
See application file for complete search history.

(56) References Cited

U.S. PATENT DOCUMENTS

| 6,732,289 | B1 | 5/2004 | Talagala et al. |
| 7,401,251 | B1 | 7/2008 | Haynes et al. |
| 7,474,623 | B2 | 1/2009 | Boyd et al. |
| 2006/0271718 | A1 | 11/2006 | DiPlacido, Jr. et al. |
| 2007/0234130 | A1 | 10/2007 | Sullivan et al. |
| 2008/0052443 | A1 | 2/2008 | Cassiday et al. |
| 2008/0235429 | A1* | 9/2008 | Gundam et al. .............. 710/313 |
| 2009/0063894 | A1 | 3/2009 | Billau et al. |
| 2009/0164694 | A1 | 6/2009 | Talayco et al. |
| 2009/0248947 | A1 | 10/2009 | Malwankar et al. |
| 2009/0292960 | A1 | 11/2009 | Haraden et al. |
| 2010/0011261 | A1 | 1/2010 | Cagno et al. |
| 2010/0153592 | A1* | 6/2010 | Freimuth et al. ................ 710/38 |
| 2010/0312943 | A1* | 12/2010 | Uehara et al. ................. 710/316 |

OTHER PUBLICATIONS

C. Mohan, et al., "Method for Data Base Recovery in Client-Server Architectures", IBM TDB, vol. 37, No. 6A, Jun. 1994, pp. 25-30.
V. Krishnan, "Evaluation of an Integrated PCI Express IO Expansion and Clustering Fabric", IEEE Computer Society, 16th IEEE Symposium on High Performance Interconnects, 2008, pp. 93-100.

* cited by examiner

*Primary Examiner* — Michael Maskulinski
(74) *Attorney, Agent, or Firm* — William K. Konrad; Konrad Raynes & Victor LLP (57) ABSTRACT

In one aspect of the present description, in response to detection of a failure of a root server of a storage controller, a switch for input/output adapters may be reconfigured to report errors to a successor root server without reinitializing the input/output adapters. Other features and aspects may be realized, depending upon the particular application.

20 Claims, 4 Drawing Sheets

ERROR ROUTING IN A MULTI-ROOT COMMUNICATION FABRIC

BACKGROUND

1. Field

The present description relates to a method, system, and computer program product for error routing in a multi-root communication fabric.

2. Description of Related Art

There are various communication protocols for interconnecting peripheral devices such as input/output (I/O) adapters to a computing device such as a server. For example, the PCI Express (PCIe) is a protocol which is widely used in computer systems to interconnect servers to adapters or other components, often by means of a PCIe switch or a cascade of PCEe switches.

A storage controller may have multiple servers often referred to as a cluster of servers, which receive input/output requests from one or more hosts, to perform input/output operations in which data is read from or written to storage through various I/O adapters. Each cluster may have one or more central processing units (CPUs) in which the processing and memory resources of the cluster may be apportioned into logical partitions, each of which is capable of running an operating system and performing the functions of a "server". Thus, as used herein, the term "server" may be used to refer to a physical server or a logical partition performing a server function.

A server may have multiple I/O adapters including host and device adapters which are accessed through a switch such as a PCIe switch. In one known design, the switch has one "upstream port" connected to the server, and several downstream ports connected to the various I/O adapters. These are referred to as transparent ports.

To increase efficiency, it is often desirable to share I/O adapters amongst the servers of the cluster. Thus, a device adapter, for example, may be shared as a "virtual" device adapter. The servers typically communicate with the device adapters and other I/O adapters over a "fabric" which may comprise one or more interfaces providing communication paths between the servers and adapters.

However, each I/O adapter typically is assigned a particular server which is designated the "root server" or "root node" for that I/O adapter. A group of I/O adapters may share a root server. One function of the root server is to control the associated I/O adapters including handling error messages from I/O adapters controlled by the root server. Error messages, in the form of packets in the PCIe protocol, provide notice of errors occurring in the shared I/O adapter or in the fabric, and are typically handled with special requirements. More particularly, such error messages often need to be routed to the root server to which the I/O adapter is assigned and by which the adapter is controlled.

The fabric may include one or more switches which permit the I/O adapters to be shared by the servers. Each switch typically includes routing logic which logically couples a selected upstream port of the switch to a selected downstream port of the switch. In this manner, a particular server coupled to an upstream port, may be logically coupled to a particular device adapter coupled to a downstream port, for the purpose of conducting I/O operations between that server and storage via the device adapter. Similarly, a particular server coupled to an upstream port, may be logically coupled to a particular host coupled to a downstream port, for the purpose of conducting I/O operations between that server and host via the host adapter. Thus, each server may be logically coupled to each I/O adapter of the shared adapters via the switch.

Each switch typically further includes error reporting logic. In the course of an I/O operation, an error may be detected by the switch or one or more of the shared I/O or host adapters. The switch is configured or programmed to report the occurrence of an error via the "transparent" upstream port which is the upstream port connected to the root server for the switch and the shared I/O adapters coupled to the switch.

It is believed that the upstream port connected to the root server is typically configured as a transparent port by the root server when the switch and the I/O adapters connected to the switch are initialized. Thus, the switch and the shared I/O adapters connected to the switch may be connected to the fabric and powered on to initial hardware and software startup states following power on. The server designated to be the root server for the switch and its associated I/O adapters detects the presence of the switch and the I/O adapters in the fabric and initializes the switch and the I/O adapters using appropriate driver software in the server.

Thus, at startup, the driver software of the root server stores configuration data in the switch to configure a port as the transparent upstream port if it was not already so configured as a transparent upstream port by default. In addition, the root server configures additional ports as "non-transparent" ports if not already configured as non-transparent upstream ports by default. In some PCIe switch designs, a downstream port may be connected to a server and configured as non-transparent port. The server connected to the non-transparent port sees that port as an endpoint. In this manner, the non-transparent port connected to a server logically functions as a non-transparent upstream port.

Hence, each of the servers may access each of the initialized I/O adapters via the initialized switch to conduct I/O operations. Conversely, each of the I/O and host adapters may access each of the servers to conduct I/O operations such as direct memory access (DMA) operations. However, the I/O adapters are controlled by the root server which initialized the switch and the I/O adapters at startup.

In the event that the root server fails, the I/O adapter hardware and software may be reset. During such a reset, the I/O adapter hardware and software may be returned to an initial startup state. The reset I/O adapters may be reinitialized by another server so that the reinitialized I/O adapters are controlled by a different server which becomes a new or successor root server for those I/O and host adapters. In connection with the reinitialization, the switch may be reinitialized so that the switch port connected to the successor root server and functioning as an upstream port is configured to be the transparent upstream port.

Various types of errors may occur in an I/O adapter such as a device adapter. For example, many communication systems employ a periodic cyclic redundancy check (CRC) to detect alteration of data being communicated. Thus, I/O transactions to a device adapter may have CRC errors, may be malformed, poisoned, timed out, aborted, unexpected, unsupported, etc. In a PCI Express fabric, in response to a detected error, details of the PCI transaction in which the error arose may be logged in one or more PCI standard advanced error reporting (AER) registers. In some applications, a generic error message may be sent to the root server by the switch via the transparent upstream port.

SUMMARY

In one aspect of the present description, in response to detection of a failure of a root server of a storage controller, a switch for I/O adapters including host adapters and device adapters, may be reconfigured to report errors to a successor root server without reinitializing the I/O adapters.

In one embodiment, a storage controller having a cluster of servers, a plurality of I/O adapters including a plurality of host adapters coupled to a group of hosts and a plurality of device adapters coupled to the storage, and a switch coupling the servers to the I/O, performs operations, the operations including initializing operations of the plurality of I/O adapters coupled to a first server of the cluster of servers, through a transparent, first upstream port of the switch so that the first server operates as a root server to the plurality of I/O adapters, and I/O adapter driver software of the root, first server is configured to process error messages from the plurality of I/O adapters; detecting a failure in the root, first server coupled to the transparent, first upstream port; and without reinitializing the I/O adapters, reconfiguring software and the switch.

In one aspect of the present description, the reconfiguring operations include reconfiguring software of a second, operational server of the cluster of servers to operate as a root server for the plurality of I/O adapters. The software reconfiguring further includes reconfiguring I/O adapter driver software of the second server to process error messages from the plurality of I/O adapters. The reconfiguring operations further include reconfiguring an upstream port of the switch coupled to the second server to be a transparent port adapted to forward error messages from the I/O adapters to the second server coupled to the transparent, second port so that the second server operates as a root server to the I/O adapters.

In another aspect of the present description, a combination of operations include assigning a server of the cluster of servers to operate as a root server to the plurality of I/O adapters; configuring I/O adapter driver software of the root, first server to process error messages from the plurality of I/O adapters; configuring the switch of the storage controller, the switch having a plurality of upstream ports, each upstream port being coupled to a server of the cluster of servers of the storage controller, and a plurality of downstream ports, each downstream port being coupled to an I/O adapter of the plurality of I/O adapters of the storage controller. The configuring includes configuring a first upstream port of the switch to be a transparent port adapted to forward error messages from the I/O adapters to the first server coupled to the transparent, first port; initializing operations of the plurality of I/O adapters coupled to the first server through the transparent, first upstream port of the switch so that the first server operates as a root server to the plurality of I/O adapters, and I/O adapter driver software of the first server is configured to process error messages from the plurality of I/O adapters. The combination of operations further includes receiving input/output operation requests from the hosts and performing input/output operations in the storage in response to the requests, the performing including the switch coupling an upstream port to a downstream port to couple a server of the cluster of servers, to an I/O adapter of the plurality of I/O adapters; detecting a failure in the root, first server coupled to the transparent port wherein the detecting comprises a surviving server of the cluster of servers detecting failure to receive a heartbeat message from the root, first server; assigning a second, operational server of the cluster of servers to operate as a root server for the plurality of I/O adapters; and without reinitializing the I/O adapters, reconfiguring software of the second, operational server of the cluster of servers to operate as a root server for the plurality of I/O adapters. The software reconfiguring includes reconfiguring I/O adapter driver software of the second server to process error messages from the plurality of I/O adapters; and reconfiguring the transparent, first port of the switch to be a non-transparent port so that the reconfigured non-transparent, first port does not forward error messages from the I/O adapters to the first server coupled to the first port so that the first server is no longer the root server to the I/O adapters. The operations further include reconfiguring the upstream port of the switch coupled to the second server to be a transparent port adapted to forward error messages from the I/O adapters to the second server coupled to the transparent, second port so that the second server operates as a root server to the I/O adapters; and operating a bidding protocol to allow the first server to rejoin the cluster of servers after the first server has been repaired.

In yet another aspect of the present description, the combination of operations further includes reconfiguring software of the repaired, first server to operate as a root server for the plurality of I/O adapters, the software reconfiguring includes reconfiguring I/O adapter driver software of the first server to process error messages from the plurality of I/O adapter. The operations further include reconfiguring the transparent, second port of the switch to be a non-transparent port so that the reconfigured non-transparent, second port does not forward error messages from the I/O adapters to the second server coupled to the second upstream port so that the second server is no longer the root server to the I/O adapters; and reconfiguring the non-transparent, upstream port of the switch coupled to the first server to be a transparent port adapted to forward error messages from the I/O adapters to the first server coupled to the transparent, first port so that the first server again operates as a root server to the I/O adapters.

Other features and aspects may be realized, depending upon the particular application.

DETAILED DESCRIPTION

Figure 1:
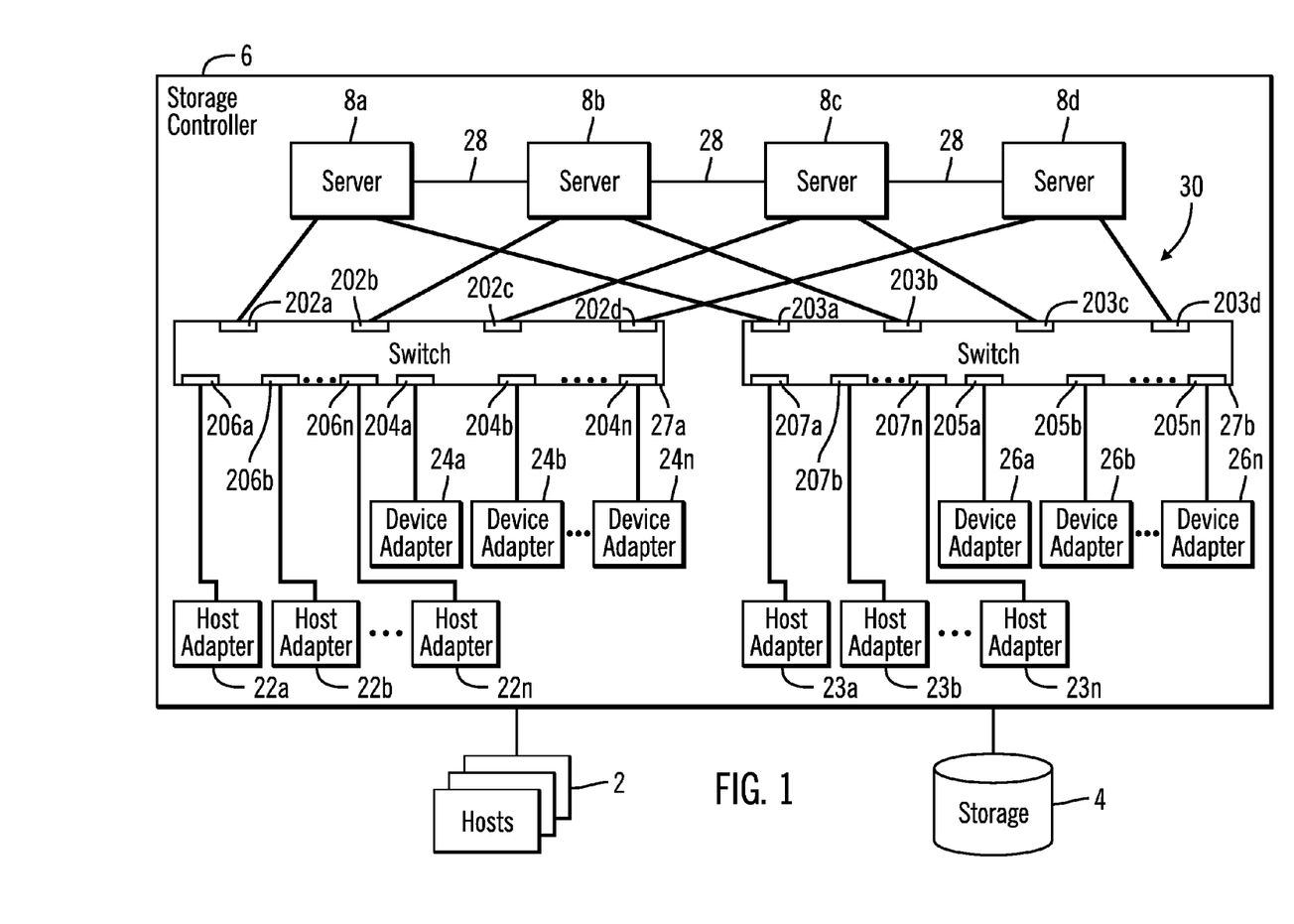
FIG. 1 illustrates an embodiment of a computing environment in which an aspect of the present description may be employed.

FIG. 1 illustrates one example of a computing environment in which aspects of the present description may be employed. One or more hosts 2 communicate Input/Output (I/O) tasks or other processing requests directed to a storage 4, through a storage cluster or controller 6, where the storage controller 6 manages access to the storage system 4. In one embodiment, the storage controller 6 includes a plurality of servers 8a, 8b, 8c, 8d, each including a processor and a memory. Each processor can include one or more central processing units (CPUs) available as processing resources to the associated server 8a-8d. Although the storage controller 6 is depicted as including four servers 8a-8d, for purposes of illustration, it is appreciated that the number of servers may be greater or lesser, depending upon the particular application.

Each server 8a-8d may have one or more logical partitions executing in the server 8a-8d. Each logical partition separately executes an operating system and device drivers. The logical partitions comprise a division of the processors into logical independent but cooperating processing systems each having their own operating systems and device drivers. Multiple logical partitions may execute in each server 8a-8d, managed by a supervisor module for that server 8a-8d.

Each device driver provides an interface between the operating system in the logical partition in which the device driver executes, and a device, such as an I/O adapter including host adapters 22a, 22b . . . 22n, and 23a, 23b . . . 23n, and device adapters 24a, 24b . . . 24n and 26a, 26b . . . 26n. The host adapters 22a, 22b . . . 22n, 23a, 23b . . . 23n, enable the servers 8a-8d to communicate with the hosts 2 and the device adapters 24a, 24b . . . 24n and 26a, 26b . . . 26n enable the servers 8a-8d to communicate with the storage 4. Thus, the servers 8a-8d share devices, such as adapters 22a, 22b . . . 22n, 23a, 23b . . . 23n, 24a, 24b . . . 24n, 26a, 26b . . . 26n. The variable "n" is used to denote an integer instance of an element, and may indicate different or the same integer value when used with different elements. For instance, 22n, 23n, 24n, 26n may indicate a same or different number of host adapters 22n, 23n and device adapters 24n, 26n.

The servers 8a-8d communicate with the host adapters 22a, 22b . . . 22n, and 23a, 23b . . . 23n, and the device adapters 24a, 24b . . . 24n, and 26a, 26b . . . 26n over a fabric 30. The fabric 30 may comprise one or more interfaces providing communication paths between the servers 8a-8d and adapters. A path comprises the hardware in the fabric 30 that enables communication with shared adapters over the fabric. In one embodiment, the fabric may comprise a Fibre Channel arbitrated loop configuration, a serial loop architecture or a bus interface, such as a Peripheral Component Interconnect (PCI) interface such as a PCI-Express interface. Each server 8a-8d may be assigned a portion of the adapters 22a, 22b . . . 22n, 23a, 23b . . . 23n, 24a, 24b . . . 24n, and 26a, 26b . . . 26n during initialization.

In the illustrated embodiment, the fabric 30 includes switches 27a, 27b. The switch 27a permits the adapters 22a, 22b . . . 22n, 24a, 24b . . . 24n to be shared by each of the servers 8a-8d. Similarly, the switch 27b permits the adapters 23a, 23b . . . 23n, 26a, 26b . . . 26n to be shared by the servers 8a-8d. Although two switches 27a, 27b are depicted for illustration purposes, it is appreciated that a greater or fewer number may be utilized, depending upon the particular application.

The servers 8a-8d may be assigned to handle I/O requests directed to specific volumes configured in the storage 4. The servers 8a-8d communicate with the storage system 4, via the device adapters 24a, 24b . . . 24n, 26a, 26b . . . 26n over a device network (not shown), which may comprise a local area network (LAN), storage area network (SAN), bus interface, serial interface, etc. As explained in greater detail below, the servers 8a-8d communicate over connections 28 enabling processor inter-communication to manage configuring operations performed with respect to the shared devices, such as the shared adapters 22a, 22b . . . 22n, 23a, 23b . . . 23n, 24a, 24b . . . 24n, 26a, 26b . . . 26n. In alternative embodiments, there may be several fabrics connecting adapters 22a, 22b . . . 22n, 23a, 23b . . . 23n, 24a, 24b . . . 24n, 26a, 26b . . . 26n.

The storage controller 6 may comprise any type of server, such as an enterprise storage server, storage controller, etc., or other device used to manage I/O requests to attached storage 4, where the storage may comprise one or more storage devices known in the art, such as interconnected hard disk drives (e.g., configured as a DASD, RAID, JBOD, etc.), magnetic tape, electronic memory, etc. The hosts 2 may communicate with the storage controller 6, via the adapters 22a, 22b . . . 22n, 23a, 23b . . . 23n, over a network (not shown), such as a Local Area Network (LAN), Storage Area Network (SAN), Wide Area Network (WAN), wireless network, etc. Alternatively, the hosts 2 may communicate with the storage controller 6 over a bus interface, such as a Peripheral Component Interconnect (PCI) bus or serial interface. It is further appreciated that the storage controller 6 may also be, for example, a generic server, not just a storage subsystem or storage controller. For example, the two servers could be IBM pSeries servers running a highly available cluster application such as Lotus Notes®.

Figure 2:
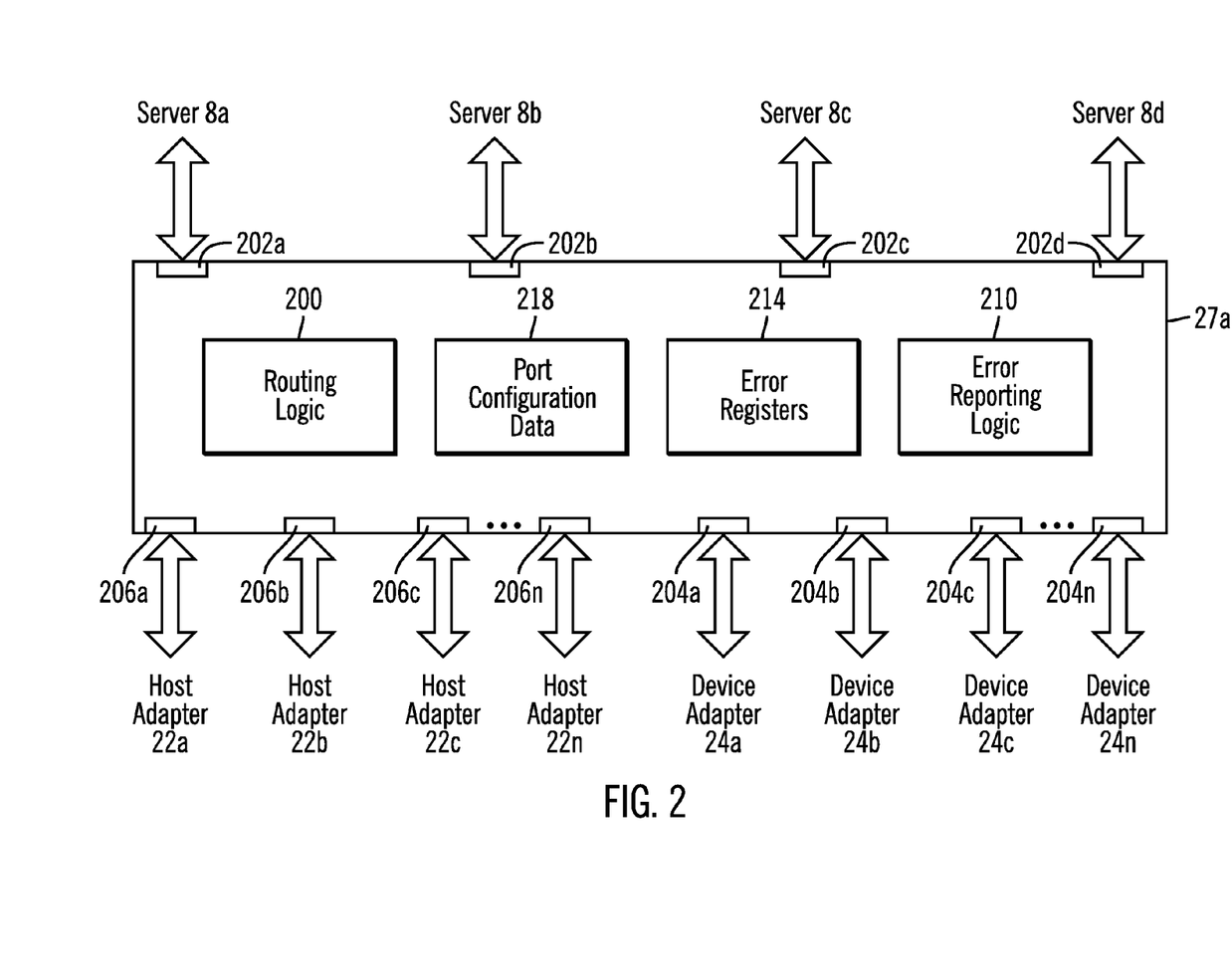
FIG. 2 illustrates an embodiment of a switch of a computing environment in which an aspect of the present description may be employed.

FIG. 2 shows one example of a switch 27a in accordance with the present description. In the illustrated embodiment, the switch 27a is a Peripheral Component Interface Express (PCIe) switch which operates in accordance with the PCIe serial bus protocol. It is appreciated that aspects of the present description may be used in systems having a switch for interconnecting a host unit to adapters or other components, utilizing other communication protocols, depending upon the particular application.

The switch 27a includes routing logic 200 which logically couples a selected upstream port of a plurality of upstream ports 202a-202d, to a selected downstream port of a plurality of downstream ports 204a, 204b, 204c . . . 204n, 206a, 206b, 206c . . . 206n. As used herein, the term "upstream port" refers to a switch port connected to a server, and the term "downstream port" refers to a port switch connected to an I/O adapter such as a device adapter, wherein the switch can logically couple a server connected to an upstream port, to an I/O adapter connected to a downstream port. In this manner, a particular server, such as server 8b, for example, coupled to upstream port 202b, may be logically coupled to a particular I/O adapter, such as device adapter 24c, for example, coupled to downstream port 204c, for the purpose of conducting I/O operations between the server 8b and a storage device of the storage 4, via the device adapter 24c. Thus, each server of the servers 8a-8d may be logically coupled to each I/O adapter of the shared device adapters 24a, 24b, 24c . . . 24n via the routing logic 200. The switch 27b (FIG. 1) is similar to the switch 27a and thus similarly includes a plurality of upstream ports 203a-203d (FIG. 1), and a plurality of downstream ports 205a, 205b, 205c . . . 205n.

The routing logic 200 of the switch 27a also logically couples a selected upstream port of a plurality of upstream ports 202a-202d, to a selected downstream port of a plurality of downstream ports 206a, 206b, 206c . . . 206n coupled to host adapters 22a, 22b, 22c . . . 22n, respectively. In this manner, a particular server, such as server 8b, for example, coupled to upstream port 202b, may be logically coupled to a particular I/O adapter, such as host adapter 22a, for example, coupled to downstream port 206a, for the purpose of conducting I/O operations between the server 8b and a host of the hosts 2, via the host adapter 22a. Thus, each server of the servers 8a-8d may be logically coupled to each host adapter of the shared host adapters 22a, 22b, 22c . . . 22n via the routing logic 200. The switch 27b (FIG. 1) is similar to the switch 27a and thus similarly includes a plurality of upstream ports 203a-203d, and a plurality of downstream ports 205a, 205b, 205c . . . 205n, 207a, 207b, 207c . . . 207n.

The switch 27a further includes error reporting logic 210. In the course of an I/O operation, an error may be detected by the switch 27a or one or more of the I/O adapters 22a, 22b . . . 22n, 24a, 24b, 24c . . . 24n or other I/O adapters coupled to the switch 27a. The error may take any of a number of forms including an error in data transmission, a timed out operation, an aborted operation, an unexpected operation, an unsupported operation, etc. Details concerning the detected error may be stored in error registers such as the error registers 214. Other embodiments may lack such error registers.

The error reporting logic 210 and the routing logic 200 are programmed or configured to report the occurrence of an error via the transparent upstream port which is connected to the "root" or "home" server for the switch 27a and the I/O adapters 22a, 22b . . . 22n, 24a, 24a, 24a, 24b, 24c . . . 24n coupled to the switch 27a. The root server may also read the information stored in the error registers 214 to determine additional details concerning the reported error.

Thus, if the server 8a, for example, is the root server for the switch 27a, the upstream port 202a connecting the server 8a to the switch 27a has been configured as a "transparent" port. The routing logic 200 forwards the error messages reported by the error reporting logic 210, to the transparent upstream port of the switch 27a. Hence, if the upstream port 202a has been configured as the transparent upstream port, the error messages reported by the error reporting logic 210, are routed by the routing logic 200 to the transparent upstream port 202a of the switch 27a. In this manner, the error messages are routed to the server connected to the transparent port 202a which is the root server 8a, in this example.

In the illustrated embodiment, the upstream port connected to the root server may be configured as a transparent port by the root server when the switch 27a and the I/O adapters 22a, 22b . . . 22n, 24a, 24a, 24b, 24c, . . . 24n connected to the switch 27a, are initialized. In one example of such initialization, the switch 27a and the I/O adapters 22a, 22b . . . 22n, 24a, 24a, 24b, 24c, . . . 24n connected to the switch 27a may be connected to the fabric 30 and powered on to initial hardware and software startup states following power on. The server 8a, designated to be the root server for the switch 27a and its associated I/O adapters 22a, 22b . . . 22n, 24a, 24a, 24b, 24c, . . . 24n, detects the presence of the switch 27a and the I/O adapters 22a, 22b . . . 22n, 24a, 24a, 24b, 24c, . . . 24n in the fabric 30b and initializes the switch 27a and the I/O adapters 22a, 22b . . . 22n, 24a, 24a, 24b, 24c, . . . 24n using appropriate driver software in the server 8a. Thus, the driver software of the root server 8a stores configuration data in an appropriate port configuration data memory 218, to configure the upstream port 202a as the transparent upstream port if it was not already so configured as a transparent upstream port by default. In addition, the root server 8a configures the remaining upstream ports 202b-202d as "non-transparent" ports if not already configured as non-transparent upstream ports by default. Hence, each of the servers 8a-8d may access each of the I/O adapters 22a, 22b . . . 22n, 24a, 24a, 24b, 24c, . . . 24n to conduct I/O operations. Conversely, each of the I/O adapters 22a, 22b . . . 22n, 24a, 24a, 24b, 24c, . . . 24n may access each of the servers 8a-8d to conduct I/O operations such as direct memory access (DMA) operations.

However, the I/O adapters 22a, 22b . . . 22n, 24a, 24a, 24b, 24c, . . . 24n are controlled by the root server 8a which initialized the switch 27a and the I/O adapters 22a, 22b . . . 22n, 24a, 24a, 24b, 24c, . . . 24n at startup. In the illustrated embodiment, error messages reported by the error reporting logic of the switch 27a are preferably routed only to the transparent upstream port coupled to the root server which controls the switch 27a and the associated I/O adapters 22a, 22b . . . 22n, 24a, 24a, 24b, 24c, . . . 24n. In one aspect of the present description, error messages may be rerouted to a surviving server without reinitializing the switch or I/O adapters, in the event that a failure occurs in the root server. For example, the upstream ports of the switch 27a may be reconfigured so that one of the upstream ports previously configured as a nontransparent upstream port, is reconfigured as a transparent upstream port without reinitializing the switch or I/O adapters. Similarly, the upstream port which was configured as the transparent port at the time that the then existing root server failed, may be reconfigured as a nontransparent port. In this manner, error messages may be routed to the server connected to the upstream port reconfigured as a transparent port so that server operates as the successor root server for the switch 27a.

Figure 3:
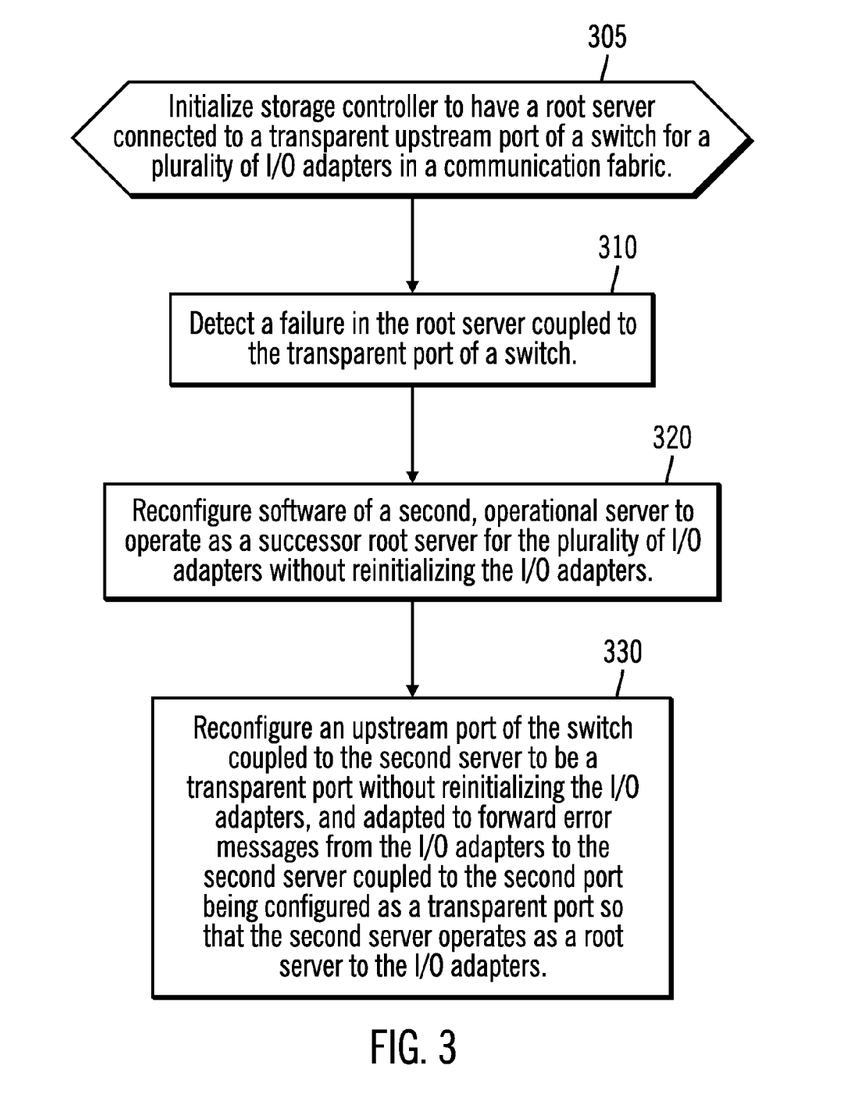
FIG. 3 depicts an example of operations for reconfiguring upstream ports of a switch in accordance with one embodiment of the present description.

FIG. 3 shows an example of operations for reconfiguring upstream ports of a switch in accordance with one embodiment of the present description. In this example, operations are performed by a storage controller having a cluster of servers coupled to a host. The storage controller further has a plurality of device adapters coupled to storage, a plurality of host adapters coupled to the host, and a switch coupling the servers to the I/O adapters including the host adapters and device adapters. As described above, FIG. 1 shows an example of a storage controller 6 having a cluster of servers 8a-8d coupled to one or more hosts 2. The storage controller 6 further has a communication fabric 30 which includes a plurality of device adapters 24a, 24b, 24c, . . . 24n coupled to storage 4, a plurality of host adapters 22a, 22b . . . 22n coupled to hosts 2, and a switch 27a coupling the servers 8a-8d to the I/O adapters 22a, 22b . . . 22n, 24a, 24a, 24b, 24c, . . . 24n.

A storage controller, such as the storage controller 6, may be initialized (block 305) to have a root server connected to a transparent upstream port of the switch in the communication fabric. As discussed above, a server of the cluster of servers may initially be assigned the role of operating as a root server to the plurality of I/O adapters. In the assigned server, I/O adapter driver software of the assigned server may be configured to permit the assigned server to function as the root server including processing error messages from the plurality of host adapters and device adapters controlled by the root server.

Furthermore, during initialization, the switch of the storage controller may be configured by configuring one of the upstream ports of the switch to be a transparent port adapted to forward error messages from the host adapters and device adapters to the root server via the transparent upstream port. Also, the plurality of host adapters and device adapters coupled to the switch may be initialized so that the server connected to the transparent upstream port operates as a root server to the plurality of host adapters and device adapters. Such initialization of the host adapters and device adapters typically involves a hardware or software start or restart or reset of the host adapters and device adapters.

Once the host adapters and device adapters are initialized, the storage controller may begin receiving input/output operation requests from the host and performing input/output operations in the storage in response to the requests. During such input/output operations, the switch in the communication fabric couples an upstream port to a downstream port, to couple a server of the cluster of servers, to an I/O adapter of the plurality of shared host adapters and device adapters, to route input/output data transmissions through the switch. Any error messages generated by the switch or the plurality of shared host adapters and shared device adapters are routed through the transparent port to the root server.

In another operation, a failure in the root server coupled to the transparent port of the switch, may be detected (block 310). In the illustrated embodiment, such a detection may include a surviving server of the cluster of servers detecting failure to receive a heartbeat message from the root server over a communication line 28.

Upon detection of a failure in the root server, a second, operational or surviving server of the cluster of servers may be assigned by the cluster to operate as a successor root server for the plurality of shared host adapters and device adapters. Accordingly, the driver software of the assigned server may be configured (block 320) to operate as a successor root server for the plurality of shared host adapters and device adapters. For example, host adapter driver software and device adapter driver software of the successor root server may be reconfigured to process error messages from the plurality of shared host adapters and device adapters.

In another operation, the nontransparent upstream port of the switch coupled to the server assigned to become the successor root server, is reconfigured (block 330) to be a transparent port. Accordingly, the upstream port reconfigured as a transparent upstream port is adapted to forward error messages from the host adapters and device adapters of the switch to the second server coupled to the reconfigured transparent port so that the second server operates as a successor root server to the host adapters and device adapters of the switch.

In the illustrated embodiment, such reconfiguration of the switch and the driver software of the successor root server is performed without reinitializing the I/O adapters. Thus, the hardware or software of the host adapters and device adapters need not be restarted or otherwise reset during the reconfiguration of the switch and driver software of the server. If an input/output operation request is received during reconfiguration of the switch or driver software, a busy message or other message may be sent to the host or hosts to temporarily defer processing additional input/output operations by the storage controller while the switch or driver software is being reconfigured.

Furthermore, the initial transparent upstream port of the switch may be reconfigured to be a non-transparent port so that the port reconfigured as a non-transparent upstream port does not forward error messages from the host adapters and device adapters to the failed server coupled to that port. As a result, the failed server no longer operates as the root server to the shared host adapters and device adapters of the switch.

In one aspect of this embodiment, it is believed that reconfiguration of the switch and driver software without reinitializing the host adapters and device adapters may reduce impact on input/output operations resulting from the change to the successor root server. Should a host have received a busy message in response to an input/output operation request during the reconfiguration, the host may retry the input/operation request which may then be processed by the storage controller. It is appreciated that other aspects may be utilized, in addition to or instead of, such impact reduction, depending upon the particular application.

Figure 4:
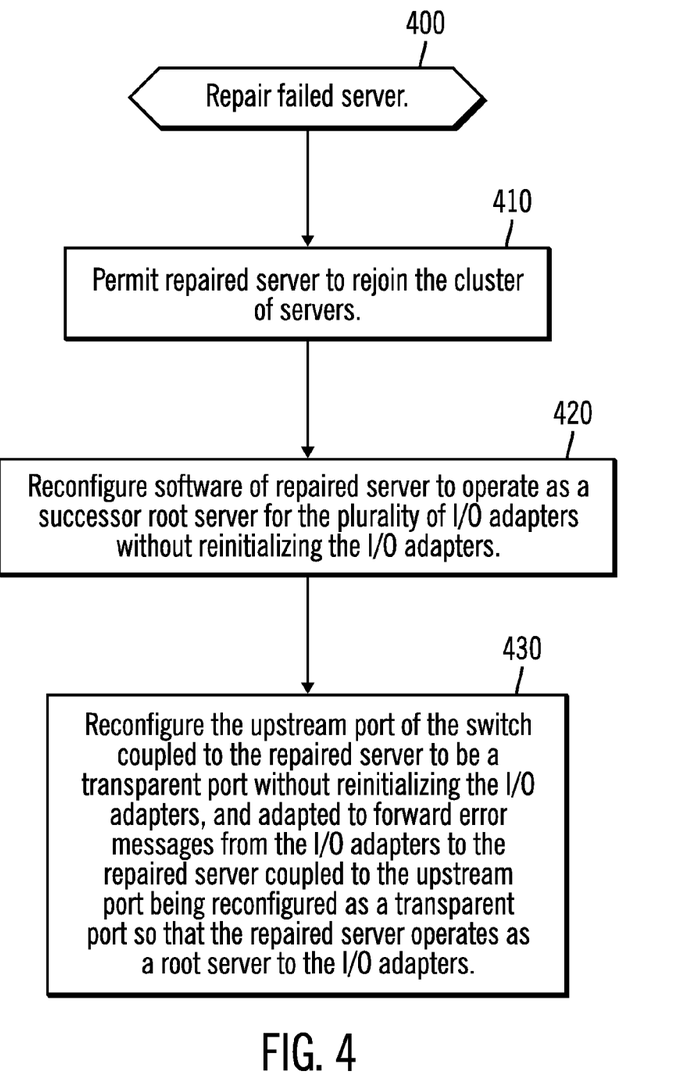
FIG. 4 depicts another example of operations for reconfiguring upstream ports of a switch in accordance with one embodiment of the present description.

FIG. 4 depicts another example of operations in accordance with an embodiment of the present description. In this example, a root server which fails and is replaced by a successor root server as described above, may be repaired (block 400). Upon being repaired, the repaired server may be permitted to rejoin the cluster of servers. For example, a bidding protocol may be operated by the cluster of servers to allow a server to rejoin (block 410) the cluster of servers after the server has been repaired. It is appreciated that a repaired server may be permitted to rejoin a cluster of servers using other techniques, depending upon the particular application.

In another operation, software of the repaired server may be reconfigured (block 420) to operate as a root server for the plurality of I/O adapters connected to the switch. For example, host adapter driver software and device adapter driver software of the repaired server may be reconfigured to process error messages from the plurality of host adapters and device adapters connected to the switch.

Furthermore, the upstream port of the switch coupled to the repaired server may be reconfigured (block 430) to be a transparent port adapted to forward error messages from the host adapters and device adapters to the repaired server coupled to the upstream port being configured as a transparent port. As a consequence, the repaired server may operate as a root server to the host adapters and device adapters connected to the switch.

In this example, the server which operates as the successor root server while the original root server is being repaired, may be referred to as the temporary, successor root server. In connection with reconfiguring the upstream port connected to the repaired server as a transparent port, the upstream port connected to the temporary, successor root server, may be reconfigured back to being a non-transparent upstream port. Once so reconfigured, that reconfigured upstream port does not forward error messages from the host adapters and device adapters to the temporary successor root server such that the temporary successor server no longer operates as the root server to the host adapters and device adapters.

In this illustrated embodiment also, such reconfiguration of the switch and the driver software of the successor root server may be performed without reinitializing the host adapters and device adapters. Thus, the host adapters and device adapters need not be restarted or otherwise reset during the reconfiguration of the switch and driver software. If an input/output operation request is received during reconfiguration of the switch or driver software, a busy message or other message may be sent to the host or hosts to temporarily defer processing additional input/output operations by the storage controller while the switch or driver software is being reconfigured.

Additional Embodiment Details

The described operations may be implemented as a method, apparatus or article of manufacture or computer program product using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise storage media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented as hardware logic in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable storage medium at the receiving and transmitting stations or devices. An "article of manufacture" comprises computer readable storage medium, hardware logic, and/or transmission signals in which code may be implemented. A device in which the code implementing the described embodiments of operations is encoded may comprise a computer readable storage medium, computer readable transmission medium or hardware logic. Of course, those skilled in the art will recognize that many modifications may be made to this configuration without departing from the scope of the present invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The variables "n" and "m" when used to represent a variable number of an element may indicate any number of instances of the element, and may indicate different integer numbers when used with different elements.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3-4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for use with a host and storage, comprising:
   operations by a storage controller having a cluster of servers, a plurality of input/output adapters including a host adapter coupled to the host and a plurality of device adapters coupled to the storage, and a switch coupling the servers to the input/output adapters, said operations including:
      initializing operations of the plurality of input/output adapters coupled to a first server of the cluster of servers, through a transparent, first upstream port of the switch so that the first server operates as a root server to the plurality of input/output adapters, and input/output adapter driver software of the root, first server is configured to process error messages from the plurality of input/output adapters;
      detecting a failure in the root, first server coupled to the transparent, first upstream port; and
      without reinitializing the input/output adapters:
         reconfiguring software of a second, operational server of the cluster of servers to operate as a root server for the plurality of input/output adapters, said software reconfiguring include reconfiguring input/output adapter driver software of the second server to process error messages from the plurality of input/output adapters; and
         reconfiguring an upstream port of the switch coupled to the second server to be a transparent port adapted to forward error messages from the input/output adapters to the second server coupled to the transparent, second port so that the second server operates as a root server to the input/output adapters.

2. The method of claim 1, wherein the operations of the storage controller further comprise without reinitializing the input/output adapters, reconfiguring the transparent, first port of the switch to be a non-transparent port so that the reconfigured non-transparent, first port does not forward error messages from the input/output adapters to the first server coupled to the first port so that the first server is no longer the root server to the input/output adapters.

3. The method of claim 1, wherein the operations of the storage controller further comprise configuring the switch of the storage controller, said switch having a plurality of upstream ports, each upstream port being coupled to a server of the cluster of servers of the storage controller, and a plurality of downstream ports, each downstream port being coupled to an input/output adapter of the plurality of input/output adapters of the storage controller, wherein said configuring includes configuring the first upstream port of said switch to be a transparent port adapted to forward error messages from the input/output adapters to a first server coupled to the transparent, first port.

4. The method of claim 3, wherein the operations of the storage controller further comprise:

repairing the first server; and without reinitializing the input/output adapters:

reconfiguring software of the repaired, first server to operate as a root server for the plurality of input/output adapters, said software reconfiguring include reconfiguring input/output adapter driver software of the first server to process error messages from the plurality of input/output adapters;

reconfiguring the transparent, second port of the switch to be a non-transparent port so that the reconfigured non-transparent, second port does not forward error messages from the input/output adapters to the second server coupled to the second upstream port so that the second server is no longer the root server to the input/output adapters; and reconfiguring the non-transparent, upstream port of the switch coupled to the first server to be a transparent port adapted to forward error messages from the input/output adapters to the first server coupled to the transparent, first port so that the first server again operates as a root server to the input/output adapters.

5. The method of claim 4, wherein the operations of the storage controller further comprise operating a bidding protocol to allow the first server to rejoin the cluster of servers after the first server has been repaired.

6. The method of claim 1, wherein the operations of the storage controller further comprise receiving input/output operation requests from the host and performing input/output operations in the storage in response to the requests, said performing including said switch coupling an upstream port to a downstream port to couple a server of the cluster of servers, to an input/output adapter of the plurality of input/output adapters.

7. The method of claim 1, wherein the operations of the storage controller further comprise assigning a server of the cluster of servers to be said first server prior to said initializing operations of the plurality of input/output adapters so that the first server operates as a root server to the plurality of input/output adapters, and input/output adapter driver software of the root, first server is configured to process error messages from the plurality of input/output adapters.

8. The method of claim 1 wherein said detecting a failure in the root, first server coupled to the transparent port, comprises a surviving server detecting failure to receive a heartbeat message from the root, first server.

9. The method of claim 1, wherein the operations of the storage controller further comprise assigning a server of the cluster of servers to be said second server prior to said reconfiguring software of the second, operational server of the cluster of servers to operate as a root server for the plurality of input/output adapters.

10. A method for use with a host and storage, comprising:

operations by a storage controller having a cluster of servers, a plurality of input/output adapters including a host adapter coupled to the host and a plurality of device adapters coupled to the storage, and a switch coupling the servers to the input/output adapters, said operations including:

assigning a server of the cluster of servers to operate as a root server to the plurality of input/output adapters;

configuring input/output adapter driver software of the root, first server to process error messages from the plurality of input/output adapters;

configuring the switch of the storage controller, said switch having a plurality of upstream ports, each upstream port being coupled to a server of the cluster of servers of the storage controller, and a plurality of downstream ports, each downstream port being coupled to an input/output adapter of the plurality of input/output adapters of the storage controller, wherein said configuring includes configuring a first upstream port of said switch to be a transparent port adapted to forward error messages from the input/output adapters to the first server coupled to the transparent, first port;

initializing operations of the plurality of input/output adapters coupled to the first server through the transparent, first upstream port of the switch so that the first server operates as a root server to the plurality of input/output adapters, and input/output adapter driver software of the first server is configured to process error messages from the plurality of input/output adapters;

receiving input/output operation requests from the host and performing input/output operations in the storage in response to the requests, said performing including said switch coupling an upstream port to a downstream port to couple a server of the cluster of servers, to an input/output adapter of the plurality of input/output adapters;

detecting a failure in the root, first server coupled to the transparent port wherein said detecting comprises a surviving server of the cluster of servers detecting failure to receive a heartbeat message from the root, first server; and without reinitializing the input/output adapters:

assigning a second, operational server of the cluster of servers to operate as a root server for the plurality of input/output adapters;

reconfiguring software of said second, operational server of the cluster of servers to operate as a root server for the plurality of input/output adapters, said software reconfiguring include reconfiguring input/output adapter driver software of the second server to process error messages from the plurality of input/output adapters; and reconfiguring the transparent, first port of the switch to be a non-transparent port so that the reconfigured non-transparent, first port does not forward error messages from the input/output adapters to the first server coupled to the first port so that the first server is no longer the root server to the input/output adapters; and reconfiguring the upstream port of the switch coupled to the second server to be a transparent port adapted to forward error messages from the input/output adapters to the second server coupled to the transparent, second port so that the second server operates as a root server to the input/output adapters; and operating a bidding protocol to allow the first server to rejoin the cluster of servers after the first server has been repaired.

11. A computer program product comprising a computer readable storage medium storing computer readable program code that, when executed on a processor of a storage controller operating with a host and storage, causes the storage controller to perform operations, wherein said storage controller has a cluster of servers, a plurality of input/output adapters including a host adapter coupled to host and a plurality of device adapters coupled to the storage, and a switch coupling the servers to the input/output adapters, the switch having a plurality of upstream ports, each upstream port coupled to a server of the cluster of servers, and a plurality of downstream ports, each downstream port coupled to an input/output adapter, each server having software including input/output adapter driver software, said operations comprising:

initializing operations of the plurality of input/output adapters coupled to a first server of the cluster of servers, through a transparent, first upstream port of the switch so that the first server operates as a root server to the plurality of input/output adapters, and input/output adapter driver software of the root, first server is configured to process error messages from the plurality of input/output adapters;

detecting a failure in the root, first server coupled to the transparent, first upstream port; and without reinitializing the input/output adapters:
    reconfiguring software of a second, operational server of the cluster of servers to operate as a root server for the plurality of input/output adapters, said software reconfiguring include reconfiguring input/output adapter driver software of the second server to process error messages from the plurality of input/output adapters; and
    reconfiguring an upstream port of the switch coupled to the second server to be a transparent port adapted to forward error messages from the input/output adapters to the second server coupled to the transparent, second port so that the second server operates as a root server to the input/output adapters.

12. The computer program product of claim 11, wherein the operations of the storage controller further comprise reconfiguring the transparent, first port of the switch to be a non-transparent port so that the reconfigured non-transparent, first port does not forward error messages from the input/output adapters to the first server coupled to the first port so that the first server is no longer the root server to the input/output adapters.

13. The computer program product of claim 11, wherein the operations of the storage controller further comprise:
configuring the switch of the storage controller, said switch having a plurality of upstream ports, each upstream port being coupled to a server of the cluster of servers of the storage controller, and a plurality of downstream ports, each downstream port being coupled to an input/output adapter of the plurality of input/output adapters of the storage controller, wherein said configuring includes configuring the first upstream port of said switch to be a transparent port adapted to forward error messages from the input/output adapters to a first server coupled to the transparent, first port;
repairing the first server; and
without reinitializing the input/output adapters:
    reconfiguring software of the repaired, first server to operate as a root server for the plurality of input/output adapters, said software reconfiguring include reconfiguring input/output adapter driver software of the first server to process error messages from the plurality of input/output adapters;
    reconfiguring the transparent, second port of the switch to be a non-transparent port so that the reconfigured non-transparent, second port does not forward error messages from the input/output adapters to the second server coupled to the second upstream port so that the second server is no longer the root server to the input/output adapters; and
    reconfiguring the non-transparent, upstream port of the switch coupled to the first server to be a transparent port adapted to forward error messages from the input/output adapters to the first server coupled to the transparent, first port so that the first server again operates as a root server to the input/output adapters.

14. The computer program product of claim 11, wherein the operations of the storage controller further comprise receiving input/output operation requests from the host and performing input/output operations in the storage in response to the requests, said performing including said switch coupling an upstream port to a downstream port to couple a server of the cluster of servers, to an input/output adapter of the plurality of input/output adapters.

15. The computer program product of claim 11 wherein said detecting a failure in the root, first server coupled to the transparent port, comprises a surviving server detecting failure to receive a heartbeat message from the root, first server.

16. A system, for use with a host and storage, comprising:
a storage controller having a cluster of servers, a plurality of input/output adapters including a host adapter coupled to the host and a plurality of device adapters coupled to the storage, and a switch coupling the servers to the input/output adapters, the switch having a plurality of upstream ports, each upstream port coupled to a server of the cluster of servers, and a plurality of downstream ports, each downstream port coupled to an input/output adapter, each server having software including input/output adapter driver software, wherein the storage controller is adapted to perform operations, said operations comprising:
initializing operations of the plurality of input/output adapters coupled to a first server of the cluster of servers, through a transparent, first upstream port of the switch so that the first server operates as a root server to the plurality of input/output adapters, and input/output adapter driver software of the root, first server is configured to process error messages from the plurality of input/output adapters;
detecting a failure in the root, first server coupled to the transparent, first upstream port; and
without reinitializing the input/output adapters:
    reconfiguring software of a second, operational server of the cluster of servers to operate as a root server for the plurality of input/output adapters, said software reconfiguring include reconfiguring input/output adapter driver software of the second server to process error messages from the plurality of input/output adapters; and
    reconfiguring an upstream port of the switch coupled to the second server to be a transparent port adapted to forward error messages from the input/output adapters to the second server coupled to the transparent, second port so that the second server operates as a root server to the input/output adapters.

17. The system of claim 16, wherein the operations of the storage controller further comprise without reinitializing the input/output adapters, reconfiguring the transparent, first port of the switch to be a non-transparent port so that the reconfigured non-transparent, first port does not forward error messages from the input/output adapters to the first server coupled to the first port so that the first server is no longer the root server to the input/output adapters.

18. The system of claim 16, wherein the operations of the storage controller further comprise:
configuring the switch of the storage controller, said switch having a plurality of upstream ports, each upstream port being coupled to a server of the cluster of servers of the storage controller, and a plurality of downstream ports, each downstream port being coupled to an input/output adapter of the plurality of input/output adapters of the storage controller, wherein said configuring includes configuring the first upstream port of said switch to be a transparent port adapted to forward error messages from the input/output adapters to a first server coupled to the transparent, first port;

repairing the first server; and without reinitializing the input/output adapters:

reconfiguring software of the repaired, first server to operate as a root server for the plurality of input/output adapters, said software reconfiguring include reconfiguring input/output adapter driver software of the first server to process error messages from the plurality of input/output adapters;

reconfiguring the transparent, second port of the switch to be a non-transparent port so that the reconfigured non-transparent, second port does not forward error messages from the input/output adapters to the second server coupled to the second upstream port so that the second server is no longer the root server to the input/output adapters; and     reconfiguring the non-transparent, upstream port of the switch coupled to the first server to be a transparent port adapted to forward error messages from the input/output adapters to the first server coupled to the transparent, first port so that the first server again operates as a root server to the input/output adapters.

19. The system of claim 16, wherein the operations of the storage controller further comprise receiving input/output operation requests from the host and performing input/output operations in the storage in response to the requests, said performing including said switch coupling an upstream port to a downstream port to couple a server of the cluster of servers, to an input/output adapter of the plurality of input/output adapters.

20. The system of claim 16, wherein the operations of the storage controller further comprise assigning a server of the cluster of servers to be said first server prior to said initializing operations of the plurality of input/output adapters so that the first server operates as a root server to the plurality of input/output adapters, and input/output adapter driver software of the root, first server is configured to process error messages from the plurality of input/output adapters, wherein said detecting a failure in the root, first server coupled to the transparent port, comprises a surviving server detecting failure to receive a heartbeat message from the root, first server, wherein the operations of the storage controller further comprise assigning a server of the cluster of servers to be said second server prior to said reconfiguring software of the second, operational server of the cluster of servers to operate as a root server for the plurality of input/output adapters, and wherein the operations of the storage controller further comprise operating a bidding protocol to allow the first server to rejoin the cluster of servers after the first server has been repaired.

* * * * *